United States Patent Office 3,708,528
Patented Jan. 2, 1973

3,708,528
2,2-DIMETHYL-3-SUBSTITUTED-CYCLOPROPANE-CARBOXYLIC ACIDS AND A PROCESS FOR THEIR PRODUCTION
Barid B. Mukherjee, Dale G. Brown, and Ira D. Hill, Middlesex County, N.J., assignors to Tenneco Chemicals, Inc.
No Drawing. Filed Feb. 3, 1970, Ser. No. 8,410
Int. Cl. C07c 61/36
U.S. Cl. 260—514 P                    2 Claims

ABSTRACT OF THE DISCLOSURE

Acetyl-, hydroxy-, hydroxymethyl-, and acetoxymethyl-carenes are ozonized to form ketoaldehydes and dialdehydes that are further oxidized to 2,2-dimethyl-3-substituted-cyclopropanecarboxylic acids, such as 2,2-dimethyl-3-(β,β-diacetylethyl)cyclopropanecarboxylic acid and 2,2-dimethyl-3-(β-acetyl-γ-acetylpropanoyl)cyclopropanecarboxylic acid. These acids may be further reacted to form other acids, such as 2,2-dimethyl-3-(β-hydroxymethyl-β-carboxyethyl)cyclopropanecarboxylic acid, as well as esters and salts of the acids.

---

This invention relates to 2,2-dimethyl-3-substituted-cyclopropanecarboxylic acids and to a process for their production.

Chrysanthemic acid, pyrethric acid, and certain other carboxylic acids that contain a cyclopropyl group are of commercial interest because they are the acid components of such insecticides as pyrethrins and allethrins. These acids are ordinarily obtained from natural sources. Their synthesis is costly because they are prepared by procedures that involve many steps and that require the use of expensive reagents.

It has now been found that 2,2-dimethyl-3-substituted-cyclopropanecarboxylic acids, whose allethrolone esters have insecticidal activity, can be prepared readily and inexpensively by a process that contains only a few steps and that does not require the use of expensive reagents. In this process Δ³-carene, a commercially available terpene, is converted to an intermediate, such as 4-acetyl-Δ²-carene or Δ²-carene-4-ol, which is then ozonized to a keto-aldehyde which is further oxidized to the desired acid. The preparation of 2,2-dimethyl-3-(β,β-diacetylethyl)cyclopropanecarboxylic acid from Δ³-carene by this process is shown in the following series of equations:

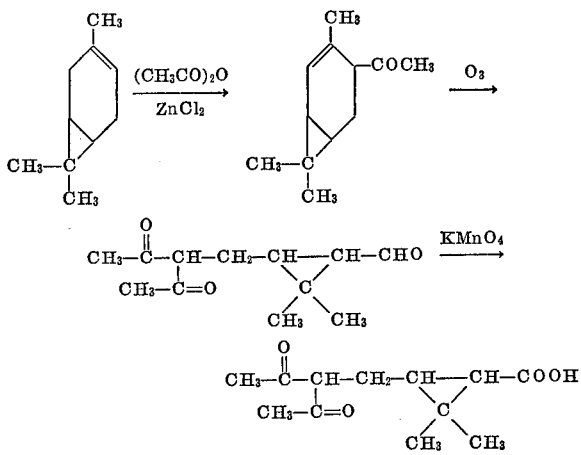

The compounds that may be prepared by this process are 2,2-dimethylcyclopropanecarboxylic acids that have the following structural formula:

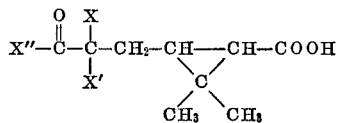

wherein X represents —H or —OH; X' represents —CH₃,

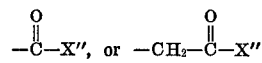

and X″ represents —OH, an alkyl group having from 1 to 4 carbon atoms, or an alkoxy group having from 1 to 4 carbon atoms. Illustrative of these compounds are the following: 2,2-dimethyl-3-(β,β-diacetylethyl)cyclopropanecarboxylic acid, 2,2-dimethyl-3-(β,β-dicarboxyethyl)cyclopropanecarboxylic acid, 2,2-dimethyl-3-(β,γ-diacetylpropanoyl)-cyclopropanecarboxylic acid, 2,2-dimethyl-3-(β,γ-dicarboxypropanoyl)-cyclopropanecarboxylic acid, α-hydroxydihydropyrethric acid, and the like.

In the process of this invention, Δ³-carene is converted to a Δ²-carene having a hydroxyl, acetoxymethyl, hydroxymethyl, or acetyl group in the 4-position, and the 4-substituted-Δ²-carene is oxidized first to the keto-aldehyde and then to the corresponding carboxylic acid.

The conversion of Δ³-carene to the 4-substituted-Δ²-carene may be effected by processes that are known in the art. For example, Δ³-carene may be reacted with paraformaldehyde and acetic acid to form 4-acetoxymethyl-Δ²-carene or with zinc chloride and acetic anhydride to form 4-acetyl-Δ²-carene. These reactions are ordinarily carried out at temperatures between room temperature and the boiling point of the reaction mixture. The 4-substituted-Δ²-carene may be separated from the reaction mixture by extraction with diethyl ether or another solvent, by distillation under vacuum, or by other known procedures.

The 4-substituted-Δ²-carene is converted to a keto-aldehyde by contacting a solution containing the substituted carene in chloroform or another solvent with ozone at a temperature in the range of about —50° C. to 10° C., and preferably about —20° to 5° C., until ozone appears in the effluent gas. The ozonized reaction mixture is usually treated with powdered zinc and acetic acid to decompose any ozonides that were formed during the ozonization. The keto-aldehyde may be separated and purified by conventional procedures.

The keto-aldehyde is oxidized to the desired 2,2-dimethylcyclopropanecarboxylic acid by treating it with potassium permanganate or another oxidizing agent. When potassium permanganate is used, the oxidation may be carried out at temperatures between 0° C. and 40° C. It is most conveniently carried out at room temperature. The resulting carboxylic acid may be separated from the reaction mixture and purified by conventional procedures.

The 2,2-dimethyl-3-substituted-cyclopropanecarboxylic acids that are prepared by the process of this invention may, if desired, be further reacted to form other cyclopropanecarboxylic acids. For example, 2,2-dimethyl-3-(β-acetyl-γ-acetylpropanoyl)cyclopropanecarboxylic acid may be converted to 2,2-dimethyl-3-(β-hydroxymethyl-β-acetoxyethyl)-cyclopropanecarboxylic acid by treating it with bromine in an alkaline aqueous solution. Reaction of 2,2-dimethyl-3-(β-hydroxymethyl-β-acetoxyethyl)-cyclopropanecarboxylic acid with acetoformic acid yields 2,2-dimethyl-3-(β-formylmethyl-β-acetoxyethyl)cyclopropanecarboxylic acid, which can be hydrolyzed to 2,2-dimethyl-3-(β-formyl-methyl-β-carboxyethyl)cyclopropanecarboxylic acid.

Esters and salts of the novel acids may be prepared by known techniques. For example, the methyl esters may be prepared by esterifying the acids with diazomethane. Other esters may be prepared by converting the acids to their acid chlorides or anhydrides and reacting the acid chlorides or anhydrides with the appropriate alcohol. Among the esters that can be prepared in this way are esters of alkanols, such as ethanol, butanol, and 2-ethylhexanol; esters of monohydric ether alcohols, such as ethylene glycol monomethyl ether and diethylene glycol monobutyl ether; esters of polyhydric alcohols, such as glycerol, sorbitol, trimethylolethane, and pentaerythritol; and esters of cyclic alcohols, such as allethrolone, 2,4-dimethylbenzyl alcohol, and 5-benzyl-3-furyl alcohol. Metal salts including the alkali metal salts, such as the sodium and potassium salts, and the alkaline earth salts, such as the calcium and barium salts; ammonium salts; amine salts, such as the salts of primary, secondary, and tertiary alkylamines; and salts of mono-, di-, and trialkanolamines, such as ethanolamine, diethanolamine, and triethanolamine, can be prepared by methods that are known to those skilled in the art.

The novel cyclopropanecarboxylic acids of this invention may be represented by the structural formula

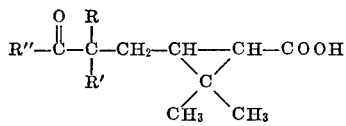

wherein R represents —H or —OH; R' represents —CH$_3$,

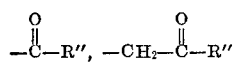

—CH$_2$—R", or

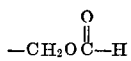

and R" represents —OH, an alkyl group having from 1 to carbon atoms, or an alkoxy group having from 1 to 4 carbon atoms.

Esters of the novel cyclopropanecarboxylic acids with allethrolone, 2,4-dimethylbenzyl alcohol, and 5-benzyl-3-furyl alcohol have been found to have insecticidal activity. The preparation of the allethronyl esters of these acids and their use in insecticidal compositions are described in detail in our copending application, Ser. No. 8,387, which was filed on Feb. 3, 1970.

The invention is further illustrated by examples that follow.

EXAMPLE 1

2,2-dimethyl-3-($\beta,\beta$-diacetylethyl)cyclopropanecarboxylic acid (A) A mixture of 136 grams of $\Delta^3$-carene and 220 ml. of acetic anhydride was stirred and heated to 50° C. in a nitrogen atmosphere. A total of 24 grams of anhydrous zinc chloride was added portion-wise to the mixture over a period of two hours. The reaction mixture was maintained at 50° C. for an additional three hours and then poured into 300 ml. of water. The resulting solution was extracted with three 150 ml. portions of diethyl ether, and the combined ether extracts were washed with a saturated sodium bicarbonate solution until there was no further evolution of gas. The organic layer was no further evolution of gas. The organic layer was separated, dried over anhydrous sodium sulfate, and heated at 60° C. under water aspirator pressure to remove the ether. When the residue was distilled, under reduced pressure, 100 grams of 4-acetyl-2-carene, which distilled at 140°–150° C.,/4 mm., was obtained.

(B) Fifty grams of 4-acetyl-2-carene was dissolved in a mixture of 200 ml. of methanol and 50 ml. of acetic acid. The solution was maintained at 5° C. Ozone from a Welsbach T–816 ozonator was bubbled through the solution at the rate of three liters per minute for about 90 minutes. At this time ozone was detected in the effluent gas with potassium iodide starch paper. Powdered zinc and acetic acid were added to the reaction mixture until no ozonides could be detected by potassium iodide starch paper. The reaction mixture was filtered and the filtrate was heated to 50°–60° C. to remove the methanol and acetic acid. About 40 grams of the diketo-aldehyde was obtained.

(C) Sixteen grams of the diketo-aldehyde was dissolved in a mixture of 120 ml. of acetone and 30 ml. of water, and the solution was cooled in an ice-bath. To the cold solution was added 14 grams of potassium permanganate in small portions. The reaction mixture was diluted with 100 ml. of water, and acetone was removed from it in a flash evaporator. The solution was filtered hot to remove the precipitated manganese dioxide, and the precipitate was washed with hot water until the filtrate was colorless. The filtrate was made alkaline with potassium hydroxide and extracted with diethyl ether to remove the last traces of acetone and other impurities. The aqueous layer was separated from the ether extract, acidified with hydrochloric acid, saturated with ammonium sulfate, and extracted with diethyl ether. The ether layer was dried over anhydrous sodium sulfate and then heated to remove the ether. The 2,2-dimethyl-3-($\beta,\beta$-diacetylethyl) cyclopropanecarboxylic acid obtained was a viscous oil.

The product was esterified with diazomethane, and the structure of the methyl ester was confirmed by NMR spectroscopy. The 2,2 - dimethyl - 3-($\beta,\beta$-diacetylethyl) cyclopropanecarboxylic acid was oxidized with sodium hypobromite and the resulting tricarboxylic acid was esterified with diazomethane. The structure of this trimethyl ester was confirmed by NMR spectroscopy.

EXAMPLE 2

2,2-dimethyl-3-($\beta$-acetyl-$\gamma$-acetyll-propanoyl)cyclopropanecarboxylic acid (A) A mixture of 200 grams of $\Delta^3$-carene, 44 grams of paraformaldehyde, and 200 grams of glacial acetic acid was heated at its reflux temperature for 48 hours. At the end of this time, unreacted $\Delta^3$-carene was removed from the reaction mixture by steam distillation. The residue was extracted with 150 percent of its volume of diethyl ether. The ether layer was washed with a 5 percent aqueous sodium bicarbonate solution until the aqueous layer was alkaline to litmus paper. The ether layer was then washed with water, dried over anhydrous sodium sulfate, and heated to remove the ether. When the residue was distilled under vacuum, 100 grams of 4-acetoxymethyl-$\Delta^2$-carene, which distilled at 120°–125° C./10 mm., was obtained.

(B) Fifty grams of 4-acetoxymethyl-$\Delta^2$-carene was dissolved in a mixture of 200 ml. of methanol and 50 ml. of acetone. The solution was maintained at 5° C. while ozone was bubbled through it at the rate of about 3 liters per minute until ozone was detected in the effluent gas with potassium iodide starch paper. Powered zinc and acetic acid were added to the reaction mixture until no ozonides could be detected by potassium iodide starch paper. The reaction mixture was filtered, and the filtrate was heated to 50°–60° C. to remove the methanol and acetic acid. About 54 grams of the keto-aldehyde was obtained.

(C) Sixteen grams of the keto-aldehyde was dissolved in a mixture of 120 ml. of acetone and 30 ml. of water, and the solution was cooled in an ice-bath. To the ice-cooled solution was added 14 grams of potassium permanganate in small portions. The reaction product was isolated and purified by the procedure described in Example 1C. There was obtained about 10 grams of 2,2-dimethyl-3-(β - acetyl - γ - acetylpropanoyl)cyclopropane-carboxylic acid, which is a viscous oil.

The product was esterified with diazomethane, and the structure of the methyl ester was confirmed by NMR spectroscopy.

EXAMPLE 3

2,2-dimethyl-3-(β-hydroxymethyl-β-carboxyethyl) cyclopropanecarboxylic acid

To 80 ml. of a 10 percent sodium hydroxide solution was added 33 grams of 2,2-dimethyl-3-(β-acetyl-γ-acetylpropanoyl)cyclopropanecarboxylic acid (the product of Example 2). To this solution was added a mixture of 94 grams of bromine in 1200 ml. of water that contained 74 grams of sodium hydroxide. The reaction mixture was stirred for one hour, and then sodium bisulfate was added to decompose the excess reagent. The precipitated bromoform was removed by filtration. The filtrate was acidified, saturated with sodium chloride, and extracted with diethyl ether. The ether layer was dried over anhydrous sodium sulfate and heated in a flash evaporator to remove the ether. There was obtained 17 grams of a mixture of carboxylic acids that contained about 50 percent of 2,2-dimethyl-3-(α - hydroxymethyl-α-carboxyethyl)cyclopropanecarboxylic acid.

The mixture of acids was esterified with diazomethane, and the resulting mixture of esters was separated into fractions by column chromatography over silica gel. One of the fractions contained an ester that was shown by NMR spectroscopy to be the methyl ester of 2,2-dimethyl-3 - (α - hydroxymethyl-α-acetoxyethyl)cyclopropanecarboxylic acid. Another fraction contained an ester that was shown by NMR spectroscopy to be the methyl ester of iso-cis-chrysanthemum dicarboxylic acid.

EXAMPLE 4

2,2-dimethyl-3-(β-formylmethyl-β-carboxyethyl) cyclopropanecarboxylic acid

To 40 ml. of acetic anhydride which had been cooled in an ice-bath was slowly added 20 ml. of 99 percent formic acid. The mixture was heated at 55° C. for 15 minutes. Fifteen milliliters of the resulting acetoformic acid was added to 7.0 grams of 2,2-dimethyl-3-(α-hydroxymethyl-α-acetoxyethyl)cyclopropanecarboxylic acid (the product of Example 3). The reaction mixture was allowed to stand at room temperature overnight and was then heated in a flash evaporator to remove volatile materials. There was obtained 6.8 grams of residue, which was shown by infrared spectroscopy to be 2,2-dimethyl-3-(β - formylmethyl - β - acetoxyethyl)cyclopropanecarboxylic acid.

EXAMPLE 5

α-Hydroxydihydropyrethric acid

A solution was prepared by dissolving 25 grams of Δ²-carene-4-ol in a mixture of 100 ml. of methanol and 25 ml. of acetic acid. The solution was maintained at 5° C. Ozone from a Welsbach T–816 ozonator was bubbled through the solution at the rate of three liters per minute until ozone was detected in the effluent gas. Powdered zinc and acetic acid were added to the reaction mixture to decompose ozonides that were formed. After filtration, the filtrate was heated to 50°–60° C. to remove the methanol and acetic acid. The residue was extracted with diethyl ether, and the ether layer was washed with sodium carbonate solution. Upon removal of the ether, there was obtained 22 grams of the dialdehyde.

Sixteen grams of the dialdehyde was dissolved in a mixture of 120 ml. of acetone and 30 ml. of water, and the solution was cooled in an ice-bath. To the cold solution was added 14 grams of potassium permanganate in small portions. The reaction mixture was diluted with 100 ml. of water, and acetone was removed from it by flash evaporation. The solution was filtered hot to remove the precipitated manganese dioxide, and the precipitate was washed with hot water until the filtrate was colorless. The filtrate was made alkaline with potassium hydroxide and extracted with diethyl ether to remove the last traces of acetone and other impurities. The aqueous layer was acidified, saturated with ammonium sulfate, and extracted with diethyl ether. The ether layer was dried over anhydrous sodium sulfate and then heated to remove the ether. The 2,2-dimethyl-3-(β-methyl-β-hydroxy-β-carboxyethyl) cyclopropanecarboxylic acid obtained was an oil.

The dicarboxylic acid was esterified with diazomethane to form the dimethyl ester of α-hydroxydihydropyrethric acid.

To a solution of 4.4 grams of the diester in 53 ml. of absolute methanol was added a solution of 2.82 grams of potassium hydroxide in 100 ml. of absolute methanol. The mixture was stirred at room temperature for 22 hours and was then heated at its reflux temperature for 105 minutes. The reaction mixture was heated at 65° C. under reduced pressure to remove the methanol from it. The residue was dissolved in 45 ml. of water, and the solution was extracted with twice its volume of diethyl ether and then acidified to pH 1 with hydrochloric acid. The aqueous solution was extracted with diethyl ether. The ether layer was heated at 65° C. under reduced pressure to remove the ether. There was obtained 3.5 of the monoester, α-hydroxydihydropyropyrethric acid, whose structure was confirmed by NMR spectroscopy.

The terms and expressions which have been employed are used as terms of description and not of limitation. There is no intention in the use of such terms and expressions of excluding any equivalents of the features shown and described or portions thereof, but it is recognized that various modifications are possible within the scope of the invention claimed.

We claim:
1. Compounds having the structural formula

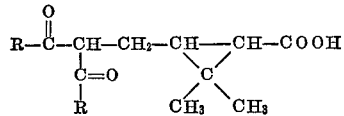

wherein each R represents an alkyl group having from 1 to 4 carbon atoms.

2. The cyclopropanecarboxylic acid having the structural formula

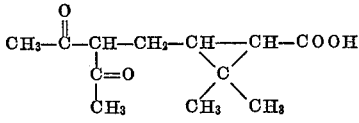

References Cited

Deno et al.: J. Am. Chem. Soc. 74, 3940 (1952).
Matsui et al.: Agr. Biol. Chem. 29, 784 (1965).
March: Advanced Organic Chemistry, pp. 871–4 (1968).

LORRAINE A. WEINBERGER, Primary Examiner

R. GERSTL, Assistant Examiner

U.S. Cl. X.R.

260—347.4, 468 P, 488 R, 489, 501.1, 501.17, 544 L, 546, 586 R, 587, 631.5; 424—306